United States Patent
Rowlinson et al.

(10) Patent No.: US 12,012,931 B2
(45) Date of Patent: Jun. 18, 2024

(54) METHOD OF AVOIDING EDGEWISE VIBRATIONS DURING NON-OPERATIONAL PERIODS OF A WIND TURBINE

(71) Applicant: Vestas Wind Systems A/S, Aarhus N (DK)

(72) Inventors: Benjamin Rowlinson, Taipei (TW); Paul Badger, Salisbury (GB); Tomas Vronsky, Southhampton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 84 days.

(21) Appl. No.: 17/779,643

(22) PCT Filed: Nov. 25, 2020

(86) PCT No.: PCT/DK2020/050333
§ 371 (c)(1),
(2) Date: May 25, 2022

(87) PCT Pub. No.: WO2021/104597
PCT Pub. Date: Jun. 3, 2021

(65) Prior Publication Data
US 2022/0403823 A1  Dec. 22, 2022

(30) Foreign Application Priority Data
Nov. 26, 2019  (DK) ............................ PA 2019 70731

(51) Int. Cl.
*F03D 7/02* (2006.01)
*F03D 7/04* (2006.01)

(52) U.S. Cl.
CPC ............. *F03D 7/0268* (2013.01); *F03D 7/02* (2013.01); *F03D 7/0296* (2013.01);
(Continued)

(58) Field of Classification Search
CPC ..... Y02E 10/72; F03D 7/0224; F03D 7/0204; F03D 7/047; F03D 13/35; F03D 7/0212;
(Continued)

(56) References Cited

U.S. PATENT DOCUMENTS 8,749,084 B2 *  6/2014  Gjerlov ................. F03D 7/0268
                                                      290/44
9,316,202 B2 *  4/2016  Bech ....................... F03D 80/00
(Continued)

FOREIGN PATENT DOCUMENTS

| CN | 107514337 A   | 12/2017 |
| EP | 2483555 A2    | 8/2012  |
| WO | 2011067304 A1 | 6/2011  |

OTHER PUBLICATIONS

Danish Patent and Trademark Office, Search and Examination Report in PA 2019 70731, May 6, 2020.
(Continued)

*Primary Examiner* — Eric J Zamora Alvarez
(74) *Attorney, Agent, or Firm* — Wood Herron & Evans LLP

(57) ABSTRACT

There is provided a method of avoiding edgewise vibrations during a non-operational period of a wind turbine. The method comprises defining a non-operational period for a wind turbine arranged at a specific site, determining expected wind conditions at the specific site during the non-operational period and defining a plurality of potential yaw orientations for the wind turbine. The method further comprises determining the relative probability of edgewise vibrations occurring during the non-operational period for each potential yaw orientation based upon the expected wind conditions during the non-operational period, determining one or more preferred yaw orientations, which are the yaw orientations in which the probability of edgewise vibrations
(Continued)

occurring is lowest, and arranging the wind turbine in one of the preferred yaw orientations during the non-operational period.

9 Claims, 4 Drawing Sheets

(52) U.S. Cl.
CPC ............. *F03D 7/0298* (2023.08); *F03D 7/04* (2013.01); *F05B 2260/82* (2013.01); *F05B 2260/96* (2013.01); *F05B 2270/32* (2013.01); *F05B 2270/321* (2013.01); *F05B 2270/329* (2013.01)

(58) Field of Classification Search
CPC .... F03D 7/0264; F03D 7/0292; F03D 1/0675; F03D 7/0268; F03D 7/0296; F03D 7/02; F03D 7/0298; F03D 7/04; F03D 7/048; F05B 2270/32; F05B 2270/321; F05B 2270/334; F05B 2270/329; F05B 2260/821; F05B 2260/96; F05B 2260/82

See application file for complete search history.

(56) References Cited

U.S. PATENT DOCUMENTS

| 2010/0283245 | A1 | 11/2010 | Gjerlov et al. |
| 2010/0301604 | A1 | 12/2010 | Nielsen et al. |
| 2017/0321654 | A1* | 11/2017 | Zheng .................... F03D 7/028 |

OTHER PUBLICATIONS

European Patent Office, International Search Report and Written Opinion in PCT Application No. PCT/DK2020/050333, Feb. 22, 2021.

* cited by examiner (East Orientation)

(South West Orientation)

METHOD OF AVOIDING EDGEWISE VIBRATIONS DURING NON-OPERATIONAL PERIODS OF A WIND TURBINE

TECHNICAL FIELD

The present invention relates generally to wind turbines, and more specifically to a method of avoiding edgewise vibrations of wind turbine blades during non-operational periods of a wind turbine.

BACKGROUND

A horizontal axis wind turbine (HAWT) typically comprises a rotor supported by a nacelle arranged at the top of a tower. The rotor generally comprises a plurality of rotor blades extending from a central hub, which is configured to rotate about a substantially horizontal rotor axis. Most modern utility-scale horizontal axis wind turbines comprise both a yaw system and a pitch system for controlling operation of the wind turbine. In normal operation, the yaw system turns the nacelle about a substantially vertical axis to ensure that the rotor consistently faces the oncoming wind, i.e. the rotor plane is maintained perpendicular to the wind. The pitch system is configured to turn the blades about their longitudinal pitch axes so that the angle of attack of the blades can be adjusted for optimal energy production.

During commissioning of a wind farm or during certain maintenance or servicing operations, it may be necessary to suspend the yaw system such that the wind turbine rotor is maintained at a fixed yaw position, often facing the predominant wind direction. It may also be necessary to lock the rotor in order to prevent the rotor from turning about the rotor axis. Alternatively or additionally, the blades may be pitched out of the wind, into a so-called 'feathered' orientation, such that they do not generate significant lift. This is known as a standstill condition. In a standstill condition or other non-operational state, the wind turbine is not generating energy.

During non-operational periods, such as described above, the rotor blades are susceptible to edgewise vibrations when the local in-flow angles may be larger than during operation. Vibrations may develop due to negatively damped aerodynamic conditions or due to vortex shedding, which has the potential to cause significant damage to the blades. This problem is well known, and various methods for preventing or damping such vibrations have been proposed. For example, applicant's previous PCT application WO 2011/067304 A1 describes the provision of nets (so-called 'fishnets') over the ends of parked wind turbine blades. The nets provide a non-aerodynamic surface that disrupts the airflow over the blade and increases the amount of positive damping in the system to mitigate the conditions that cause edgewise vibrations.

The nets described in WO 2011/067304 A1 are very effective at preventing edgewise vibrations during standstill conditions, and therefore are provided by default during most installation and servicing operations involving the blades. However, the use of nets introduces its own disadvantages. In particular, the process of applying the nets to the blades, and then subsequently removing the nets is relatively time-consuming and therefore increases the cost and complexity of installation and maintenance operations. The nets also have a tendency to become caught up in serrations provided at the trailing edges of many modern wind turbine blades, which can cause damage to the nets and to the serrations.

Against this background, the present invention aims to provide an alternative way of avoiding edgewise vibrations during non-operational periods of a wind turbine.

SUMMARY OF THE INVENTION

According to the present invention there is provided a method of avoiding edgewise vibrations during a non-operational period of a wind turbine. The method comprises defining a non-operational period for a wind turbine arranged at a specific site, determining expected wind conditions at the specific site during the non-operational period and defining a plurality of potential yaw orientations for the wind turbine. The method further comprises determining the relative probability of edgewise vibrations occurring during the non-operational period for each potential yaw orientation based upon the expected wind conditions during the non-operational period, and determining one or more preferred yaw orientations, which are the yaw orientations in which the probability of edgewise vibrations occurring is lowest, and arranging the wind turbine in one of the preferred yaw orientations during the non-operational period.

In the present disclosure, the term "non-operational" refers to when the wind turbine is not generating electrical power. The generator of the wind turbine may be disconnected from the electricity distribution network or grid. Such a non-operational condition may occur during the commissioning of a wind turbine or during certain maintenance or servicing operations of the wind turbine, for example. When non-operational, the blades may be pitched out of the wind, into a feathered orientation, such that they do not generate significant lift and in what is known as a standstill condition.

The method may further comprise determining one or more critical yaw error zones for the wind turbine. The critical yaw error zones may represent the incident wind directions relative to a yaw direction in which edgewise vibrations are most likely to occur. The method may further comprise determining the relative probability of edgewise vibrations occurring during the non-operational period for each potential yaw orientation based upon the one or more critical yaw error zones for the wind turbine in conjunction with the expected wind conditions during the non-operational period.

The method may further comprise determining a plurality of potential wind speeds, and determining one or more critical yaw error zones for the wind turbine for each wind speed. Preferably the step of determining a plurality of potential wind speeds comprises determining a plurality of potential wind speed ranges or wind speed bins.

Determining the expected wind conditions at the specific site during the non-operational period may comprise utilising long-term wind statistics for the specific site. Additionally or alternatively, forecast wind conditions for the site may be utilised to determine the expected wind conditions at the specific site during the non-operational period. Additionally or alternatively, meteorological simulations for the site, e.g. meso-scale models, may be utilised to determine the expected wind conditions at the specific site during the non-operational period.

Further, determining the expected wind conditions at the specific site during the non-operational period may comprise defining a plurality of potential wind directions, and determining the relative probability of the wind direction being in each of the potential wind directions during the non-operational period. Preferably the step of determining the expected wind conditions at a specific site comprises determining a plurality of potential wind direction sectors.

The method may further comprise determining a plurality of potential wind speeds, and determining the relative probability of the wind speed being each of the potential wind speeds in each of the potential wind directions during the non-operational period. Preferably the method comprises determining a plurality of potential wind speed ranges or wind speed bins, determining a plurality of potential wind direction sectors, and determining the relative probability of wind speed falling within a given wind speed range, and determining the relative probability of the wind direction falling within a given sector.

The method may further comprise determining whether the probability of edgewise vibrations occurring during the non-operational period, when the turbine is in a preferred yaw orientation, is above or below a predefined risk threshold.

The method may further comprise providing one or more devices for preventing edgewise vibrations on the wind turbine in the event that the predefined risk threshold is exceeded in said preferred yaw orientation. The devices for preventing edgewise vibrations may comprise devices such as nets.

The method may further comprise making a decision not to provide one or more devices for preventing edgewise vibrations on the wind turbine in the event that the predefined risk threshold is not exceeded in said preferred yaw orientation.

BRIEF DESCRIPTION OF THE DRAWINGS

Embodiments of the present invention will now be described by way of non-limiting example only, with reference to the accompanying figures, in which.

DETAILED DESCRIPTION

During the commissioning period of a wind farm it is standard for the wind turbines of the farm to be non-operational and remain in a standstill condition until the wind farm is connected to the grid and ready to produce energy. The wind turbines are often yawed such that the rotors are facing the predominant wind direction for the site, and the yaw systems are locked in this position. Nets are provided over the ends of the wind turbine blades as described in WO 2011/067304 A1 in order to prevent edgewise vibrations that may lead to damage of the blades. These nets introduce a number of disadvantages, as already described by way of background. The present invention presents an entirely different approach to avoiding edgewise vibrations that may avoid the need to use nets or other such devices on the surfaces of the blades in many cases.

As will be described in further detail below, the present invention utilises a statistical approach to determine the likelihood of strong edgewise vibrations occurring during a particular non-operational period of a wind turbine. If the risk of potentially damaging edgewise vibrations occurring is deemed to be below a certain level, then it may be decided that it is not necessary to cover the blades with nets or other vibration-preventing devices.

The present invention has been developed based upon the realisation that edgewise vibrations are less likely to occur when a wind turbine is in certain yaw configurations. By mapping out critical yaw error zones most likely to experience edgewise vibrations, and combining this data with statistical data relating to the wind conditions of a particular site, the present invention enables a lowest risk yaw orientation to be determined. By orienting the turbine in the lowest risk yaw orientation during the period of non-operation, as opposed to orienting the turbine into the predominant wind direction or leaving it to remain in the direction it was facing during installation, it may be possible to significantly reduce the risk of edgewise vibrations occurring such that there is no need to employ nets to cover the blades of the wind turbine.

A non-limiting example of the present invention will now be described with reference to the accompanying figures.

Figure 1A:
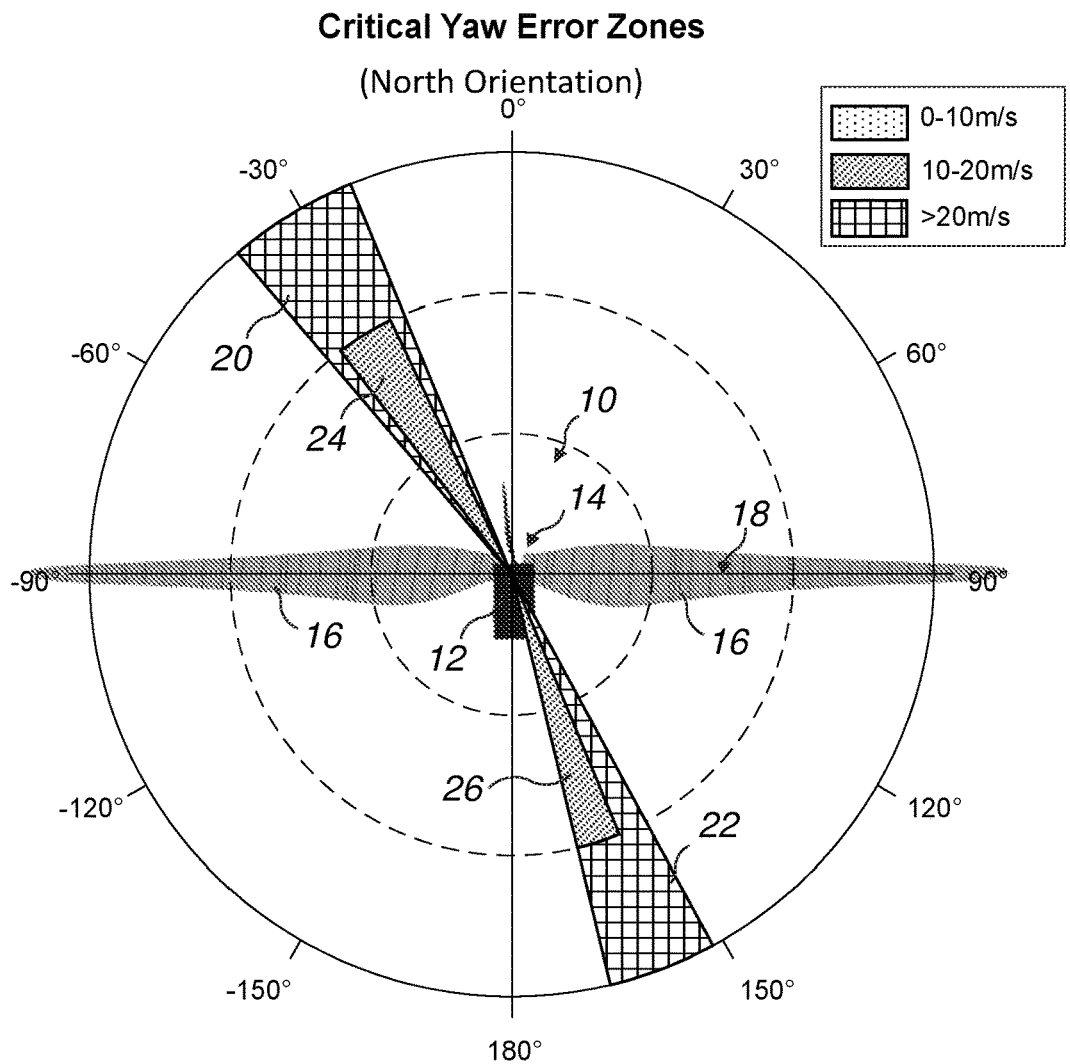
FIG. 1a shows critical yaw error zones for a particular wind turbine in a North yaw orientation.

FIG. 1a shows a wind turbine 10, which is represented schematically by a nacelle 12 and a rotor 14 comprising a plurality of rotor blades 16. The wind turbine 10 is shown in a North orientation, i.e. the rotor plane 18 is facing North. FIG. 1a additionally shows critical yaw error zones for the wind turbine 10 in this configuration. It will be appreciated that a wind turbine 10 is said to have a yaw error, if the rotor plane 18 is not perpendicular to the wind. The critical yaw error zones effectively represent the incident wind directions that present the highest risk of causing edgewise vibrations for the particular wind turbine 10 when the wind turbine 10 is in a non-operational state, for example at standstill.

The yaw error zones in FIG. 1a are binned into wind speed ranges. In this example, for wind speeds in excess of 20 m/s, a first critical yaw error zone 20 exists between approximately −22° to −40°, and a second critical yaw error zone 22 exists between approximately 152° and 167°. For wind speeds between 10 m/s and 20 m/s, a first critical yaw error zone 24 exists between approximately −25° to −37°, and a second critical yaw error zone 26 exists between approximately 157° and 167°. In this example, no critical yaw error zones exist for wind speeds in a 0 m/s to 10 m/s range, hence there are no dotted segments in FIG. 1a.

Figure 1B:
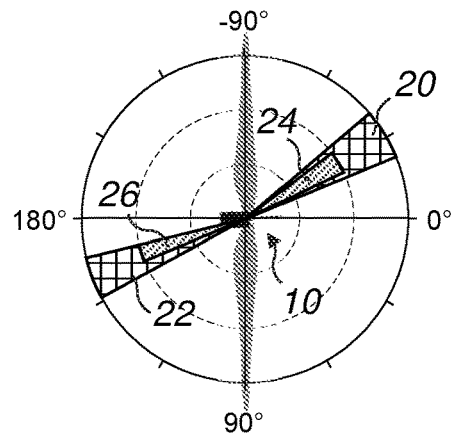
FIG. 1b shows critical yaw error zones for the same wind turbine in an East yaw orientation.
Figure 1C:
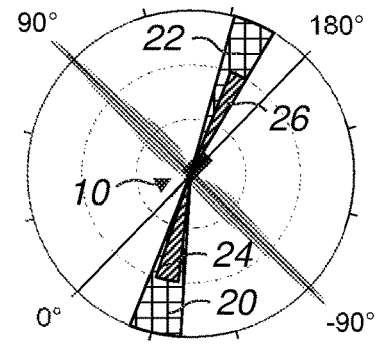
FIG. 1c shows critical yaw error zones for the same wind turbine in a West yaw orientation.

It should be appreciated that the yaw error zones are relative to the particular turbine orientation, and not the absolute "compass" direction. Accordingly, the critical yaw error zones 20, 22, 24, 26 rotate with turbine orientation, as shown in FIGS. 1b and 1c, which show East and South-West orientations of the wind turbine 10 respectively.

For example, where a turbine 10 is oriented in a North direction in a non-operational state, as shown in FIG. 1a, wind in excess of 20 m/s which is incident on the turbine at between −22° and −40° relative to the yaw direction, i.e. generally from a North-North-West (NNW) direction, would fall into the first critical yaw error zone 20, and would have a higher risk of developing edgewise vibrations in the blades. Similarly, when the turbine 10 is oriented in an East direction as shown in FIG. 1b, wind in excess of 20 m/s which is incident on the turbine 10 at between −22° and −40° relative to the yaw direction, i.e. generally from an East-North-East (ENE) direction, would again fall into the first critical yaw error zone 20, and would increase the risk of edgewise vibrations.

The yaw errors which are predicted to have an increased risk of edgewise vibrations are dependent on the specific turbine 10, rotor configuration and wind speed. Every wind turbine 10 has different yaw error (and blade azimuth) configurations which pose a risk of standstill vibrations. The critical yaw error zones 20, 22, 24, 26, may also be affected by environmental conditions at the wind turbine site, including mean turbulence intensity, air density, and wind shear etc.

Mapping out these critical yaw error zones 20, 22, 24, 26 using a systematic and consistent methodology is the first step to understanding the risk. Empirical data may be used to generate the critical yaw error zones 20, 22, 24, 26 shown in FIG. 1a. However, computer simulations are preferably used to generate the critical yaw error zones 20, 22, 24, 26, for example using one of the many aeroelastic simulation software packages commonly used in the wind industry. The skilled person is familiar with generating such models. A Critical Yaw Error Database may advantageously be developed. The database may contain critical yaw error zones (such as those depicted in FIGS. 1a-1c) for various turbine platforms operating in various configurations and in various environmental conditions.

The next stage in the procedure is to determine site specific wind characteristics, i.e. wind conditions characteristic of the specific site at which the wind turbine 10 is located. For relatively short periods of non-operation, for example during routine maintenance or inspection of the blades 16, it may be possible simply to use weather forecast data for the site. However, for longer periods of non-operation, such as during commissioning of a new wind farm, it is preferable to utilise long-term historical data of the site. This data may be commercially available or is often obtained by the installer of the wind farm utilising meteorological measurement equipment installed at the site for a period of time. An example of this will now be described with reference to FIG. 2.

Figure 2:
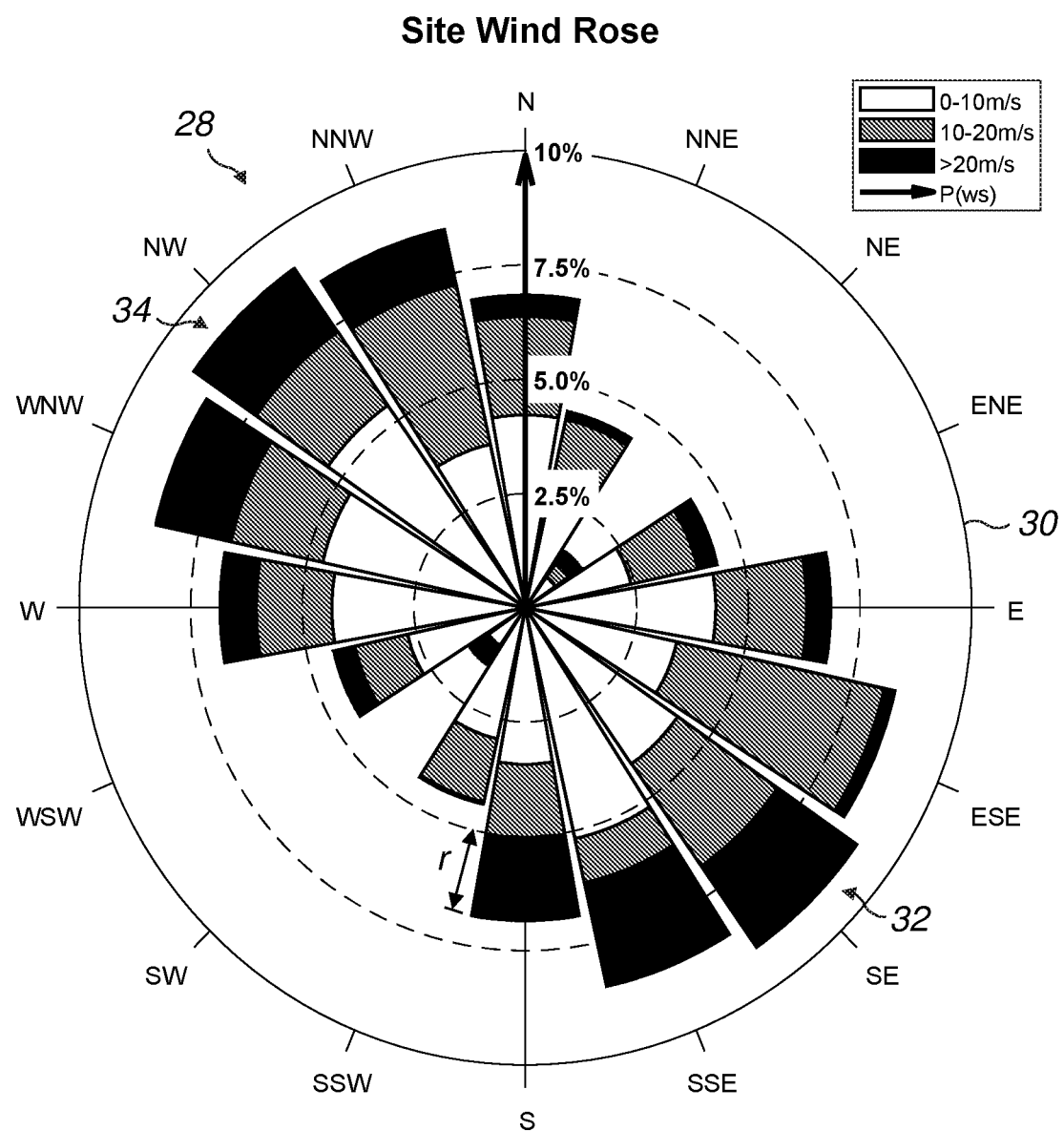
FIG. 2 is a wind rose for a site at which the wind turbine is located.

FIG. 2 shows a wind rose 28 for the site at which the wind turbine 10 is installed. The wind rose 28 shows how wind speed and direction are typically distributed at the site. Using a polar coordinate system of gridding, the frequency of winds over a time period is plotted by wind direction. The wind data may be binned into wind direction sectors such that a range of wind directions fall within a wind direction sector. The wind rose 28 may be constructed for any time period, and a time period corresponding to the period of non-operation may advantageously be chosen. Further, monthly wind roses may conveniently be constructed for a given site. Therefore, if for example a wind farm is to be commissioned during the month of August, a wind rose 28 constructed based upon historical wind conditions for the month of August for the site may be used.

In FIG. 2, black, grey and white bands are used to indicate the wind speed ranges of >20 m/s, 10 m/s to 20 m/s and 0 m/s to 10 m/s respectively. Wind directions are plotted around the circumference 30 of the wind rose 28, and the radial distance r of each band indicates relative probability (P(ws)) of a wind speed in a certain wind direction. The bands for the wind speeds in each wind direction together form a spoke in said direction. The directions of the longest spokes 32, 34 show the wind directions with the greatest frequency. In this example, the longest spokes are South Easterly (SE) 32 and North Westerly (NW) 34, indicating that winds from these directions are the most frequent. Spoke 36 has the largest radial extent r, indicating that a North Westerly (NW) wind having a speed in the range of 0-10 m/s is the most frequent.

Once the site specific wind characteristics have been determined, this information can be combined with the critical yaw error zones 20, 22, 24, 26 described in relation to FIGS. 1a-c, to determine the probability of edgewise vibrations occurring at the specific site during the period of non-operation, for any given yaw orientation. An example of this will now be described with reference to FIG. 3.

Figure 3:
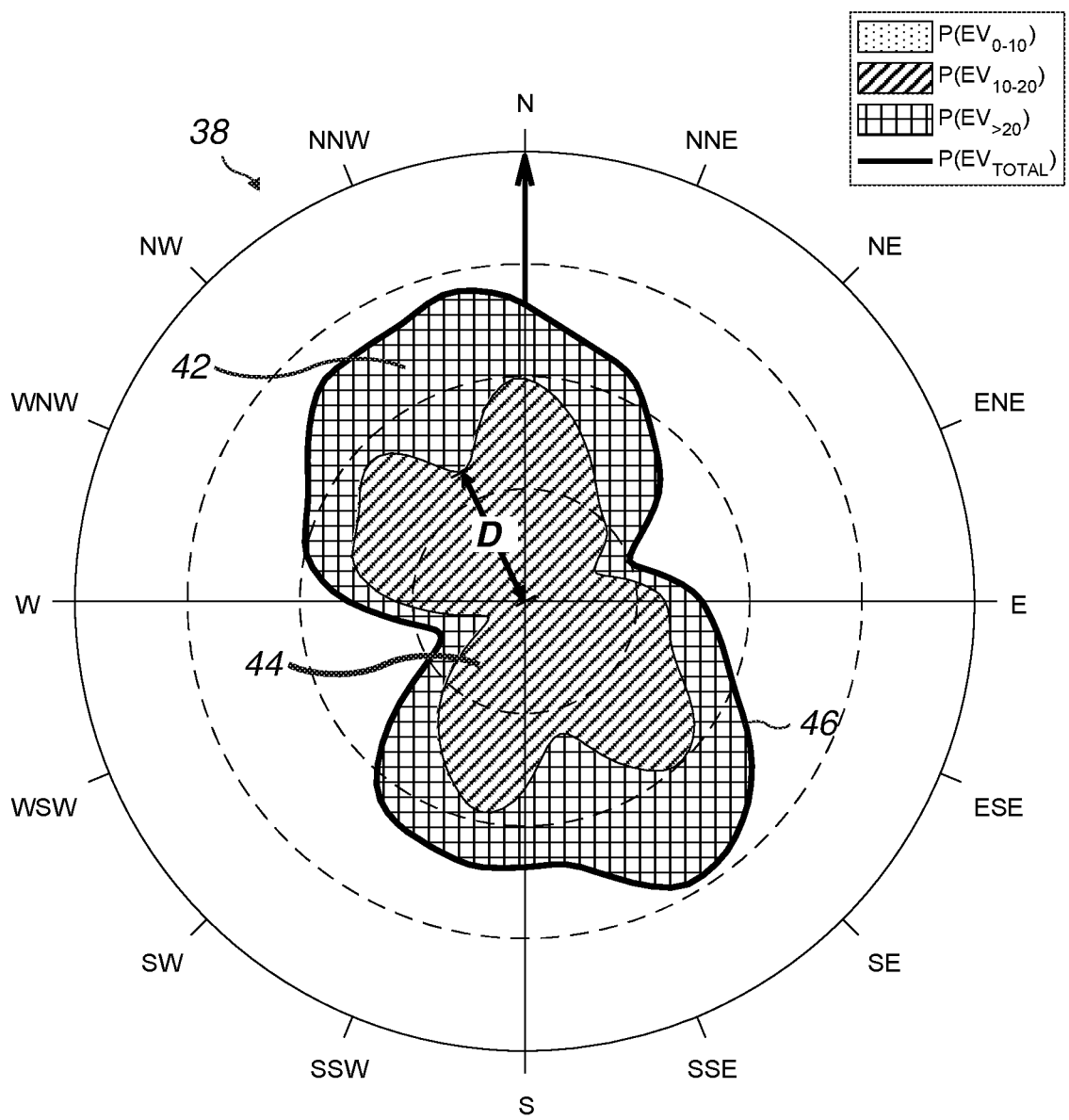
FIG. 3 shows the probability of edgewise vibrations occurring for every possible turbine yaw orientation.

FIG. 3 is a probability map 38 showing the probability of edgewise vibrations by turbine yaw orientation. For a given yaw orientation, the probability of the wind falling into one of the critical yaw error zones 20, 22, 24, 26 can be calculated by combining the site specific wind rose 28 with the critical yaw error zones 20, 22, 24, 26 for that orientation. The probability map 38 is built by performing this calculation for the full 360° of possible yaw orientations. The probability map 38 indicates the orientations with relatively lower risk and the orientations with relatively higher risk of edgewise vibrations.

In FIG. 3, yaw directions are plotted around the circumference 40 of the probability map 38, and the radial distance D indicates the relative probability of edgewise vibrations occurring during the non-operational period at the associated yaw orientation. The data is binned according to wind speeds. Grid hatched area 42 indicates the probability ($P(EV_{>20})$) of higher edgewise vibration risk conditions occurring during the non-operational period, at each possible yaw orientation, for wind speeds in excess of 20 m/s. Diagonal hatched area 44 indicates the equivalent probability ($P(EV_{>10-20})$) for wind speeds in the range of 10 m/s to 20 m/s, and dotted indicates the equivalent probability ($P(EV_{0-10})$) for wind speeds in the range of 0 m/s to 10 m/s. In this example, since there are no critical zones in the 0 m/s to 10 m/s range (see FIG. 1a), the probability for that wind speed bin is zero (no dotted area on map). The outermost contour line 46 indicates the sum total probability ($P(EV_{TOTAL})$).

Based upon structural knowledge of the specific turbine, a risk threshold 48 (see FIG. 4) can be defined below which it can be deemed as sufficiently low risk to leave the turbine 10 in that orientation during the non-operational period without the need to use nets or other means of preventing edgewise vibrations. Yaw orientations associated with a probability of edgewise vibrations below the threshold can be defined as low risk, and orientations with a probability above the threshold can be defined as higher risk.

Figure 4:
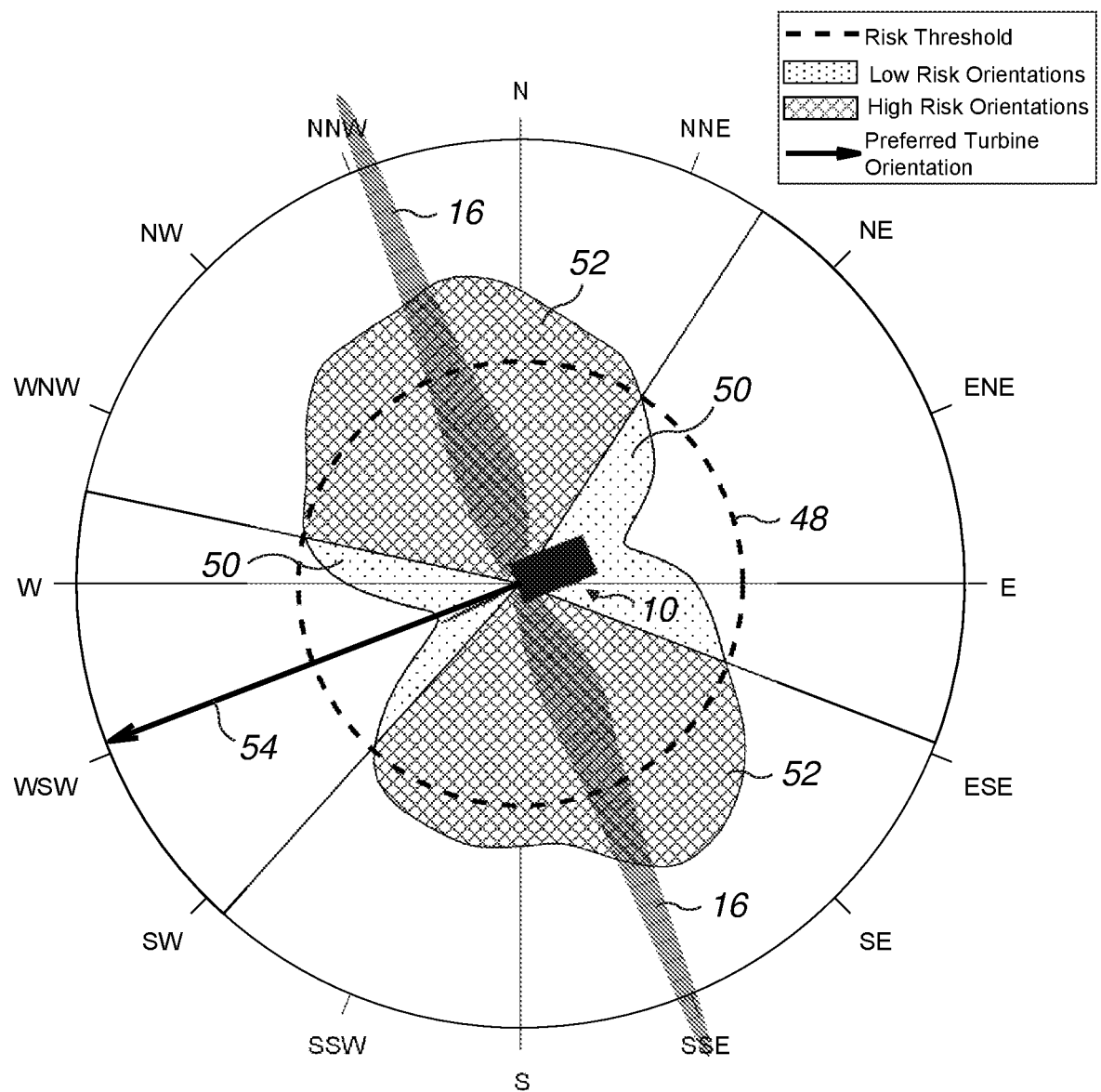
FIG. 4 shows a preferred turbine yaw orientation during a non-operational period.

FIG. 4 illustrates a risk threshold 48 (dashed line), together with lower-risk yaw orientations 50 (dotted area) and higher-risk yaw orientations 52 (cross hatched area). In this example, higher-risk yaw orientations 52 are between approximately −78° and +33° relative to a northern (0°) yaw orientation and between approximately +111° and −138° relative to North. Lower-risk yaw orientations 50 are between approximately −78° and −138° relative to North and between approximately +33° and +111° relative to North in this example. The yaw orientation that presents the lowest risk of edgewise vibrations occurring during the period of non-operation is approximately WSW, i.e. −111° relative to the northern (0°) yaw orientation. This is therefore referred to as the preferred turbine orientation 54, and the turbine 10 is shown in this preferred orientation in FIG. 4.

Accordingly, based upon the statistical data described above, a preferred yaw orientation 54 may be calculated which gives rise to the lowest risk of edgewise vibrations occurring during the non-operational period. The wind turbine may then be manually yawed to orientate the wind turbine 10 into the preferred orientation 54 at the start of the non-operational period. The yaw system may be locked so that the wind turbine 10 remains in the preferred yaw orientation 54 for the duration of the non-operational period.

As the risk of edgewise vibrations occurring in this yaw position 54 is deemed to be sufficiently low, it is not necessary to use nets to cover the blades 16. In some cases, the risk of edgewise vibrations in the preferred yaw orientation 54 may still be higher than the risk threshold 48, i.e. the preferred yaw orientation 54 may still be deemed as high risk. In such cases, a decision to use nets or other surface mounted devices may be made.

A traffic light system may conveniently be used for each yaw orientation, whereby low risk yaw orientations 50 may be categorised as 'green' and high-risk yaw orientations 52 may be categorised as 'red'. Yaw orientations having a probability of edgewise vibrations close to the risk threshold 48 could be categorised as 'amber'. This system would provide a very clear indication of the risk level for any given yaw orientation, and would allow an operator at the site to determine instantly whether or not nets or other surface modification devices need to be deployed during a non-operational period.

One possible method of preparing a turbine 10 for a period of non-use, e.g. during commissioning of the wind farm or maintenance of the turbine 10, may involve orientating the turbine 10 so that it faces the predominant wind direction and covering the blades 16 with nets by default. It has already been discussed above in relation to the wind rose 28 of FIG. 2 that the predominant wind direction for the site in this example is South Easterly (SE) or North Westerly (NW). Therefore, such a method would involve yawing the turbine 10 to NW or SE and deploying nets on the blades 16. In contrast, utilising the present invention, it can be determined that if the wind turbine 10 is orientated differently, in this case in a direction WSW, then the risk of edgewise vibrations can be reduced significantly, such that nets are no longer required. By utilising the present invention, it may be possible to avoid the need to use nets in a significant proportion of cases. Consequently, the duration of non-operational periods can be shortened as there is no need to deploy and then remove nets. Furthermore, the risk of damaging the blades 16 is avoided if nets are not used.

The present invention is particularly advantageous during the construction of a new wind farm. The process may be summarised as follows: for a chosen turbine 10 to be installed, obtain the critical yaw error map from a Critical Yaw Error Database, which maps out the expected yaw error zones that are likely to have potential edgewise vibration issues for a given turbine 10 and wind speed threshold (see FIGS. 1a-1c). Next, estimate the potential time period that the given turbine 10 will be without yaw function (e.g. time from installation until commissioning). For the given time period, obtain the long term wind statistics for the given location (e.g. monthly wind rose). For short periods a weather forecast could be used. Calculate the probabilistic lowest risk orientation for the given turbine 10 (i.e. for each possible turbine orientation, calculate the statistical probability that the wind direction and wind speed will cause a critical yaw error). Iterate until the lowest probability orientation is found. The turbine 10 should then be manually yawed to the preferred orientation 54. If the statistical risk of the turbine 10 getting into a critical yaw error zone is sufficiently low (below a predetermined risk threshold 48) then nets may not need to be installed over the rotor blades 16.

Many modifications may be made to the examples described above without departing from the scope of the present invention as defined in the accompanying claims.

The invention claimed is:

1. A method of avoiding edgewise vibrations during a non-operational period of a wind turbine, the method comprising:
   defining a predetermined non-operational period for the wind turbine arranged at a specific site;
   determining expected wind conditions at the specific site during the non-operational period;
   defining a plurality of potential yaw orientations for the wind turbine;
   determining the relative probability of edgewise vibrations occurring during the non-operational period for each potential yaw orientation based upon the expected wind conditions during the non-operational period;
   determining one or more preferred yaw orientations of the plurality of yaw orientations wherein the relative probability of edgewise vibrations occurring is lowest; and
   arranging the wind turbine in one of the preferred yaw orientations during the non-operational period.

2. The method of claim 1, further comprising determining one or more critical yaw error zones for the wind turbine, the critical yaw error zones representing incident wind directions relative to a yaw direction in which edgewise vibrations are most likely to occur,
   and wherein the method comprises determining the relative probability of edgewise vibrations occurring during the non-operational period for each potential yaw orientation based upon the one or more critical yaw error zones for the wind turbine in conjunction with the expected wind conditions during the non-operational period.

3. The method of claim 2, further comprising determining a plurality of potential wind speeds, and determining the one or more critical yaw error zones for the wind turbine for each wind speed.

4. The method of claim 1, wherein determining the expected wind conditions at the specific site during the non-operational period comprises utilising long-term wind statistics for the specific site, and/or utilising forecast wind conditions and/or meteorological simulations for the site.

5. The method of claim 1, wherein determining the expected wind conditions at the specific site during the non-operational period comprises defining a plurality of potential wind directions, and determining the relative probability of the wind direction being in each of the potential wind directions during the non-operational period.

6. The method of claim 5, further comprising determining a plurality of potential wind speeds, and determining the relative probability of the wind speed of each of the potential wind speeds for each of the potential wind directions during the non-operational period.

7. The method of claim 1, further comprising determining whether the relative probability of edgewise vibrations occurring during the non-operational period when the turbine is in a preferred yaw orientation is above or below a predefined risk threshold.

8. The method of claim 7, further comprising providing one or more devices for preventing edgewise vibrations on the wind turbine when the predefined risk threshold is exceeded in said preferred yaw orientation.

9. The method of claim 7, further comprising making a decision not to provide one or more devices for preventing edgewise vibrations on the wind turbine when the predefined risk threshold is not exceeded in said preferred yaw orientation.

* * * * *